(12) United States Patent
Fujimura et al.

(10) Patent No.: US 7,921,012 B2
(45) Date of Patent: Apr. 5, 2011

(54) APPARATUS AND METHOD FOR SPEECH RECOGNITION USING PROBABILITY AND MIXED DISTRIBUTIONS

(75) Inventors: Hiroshi Fujimura, Kawasaki (JP); Takashi Masuko, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 843 days.

(21) Appl. No.: 11/857,104

(22) Filed: Sep. 18, 2007

(65) Prior Publication Data

US 2008/0201136 A1 Aug. 21, 2008

(30) Foreign Application Priority Data

Feb. 19, 2007 (JP) .................................. 2007-038657

(51) Int. Cl.
*G10L 15/28* (2006.01)
(52) U.S. Cl. ........................................ 704/255; 704/240
(58) Field of Classification Search .................. 704/255, 704/240
See application file for complete search history.

(56) References Cited

U.S. PATENT DOCUMENTS

| | | | | |
|---|---|---|---|---|
| 5,835,890 A | * | 11/1998 | Matsui et al. | 704/255 |
| 7,720,683 B1 | * | 5/2010 | Vermeulen et al. | 704/254 |
| 2005/0216266 A1 | * | 9/2005 | Gong et al. | 704/256 |

FOREIGN PATENT DOCUMENTS

| | | |
|---|---|---|
| JP | 3176210 | 10/1995 |
| JP | 2004-117624 | 4/2004 |

OTHER PUBLICATIONS

Seiichi Nakagawa, "Voice Recognition Using Probablity Model", Published by the Institute for Electronics, Information, and Communication Engineers, 1988. Statement of relevance provided in the specification.

Kiyoshiro Shikano et al., "Speech Recognition System", published by Ohmsha, 1988. Statement of relevance provided in the specification.

* cited by examiner

*Primary Examiner* — Jakieda R Jackson
(74) *Attorney, Agent, or Firm* — Ohlandt, Greeley, Ruggiero & Perle, L.L.P.

(57) ABSTRACT

A speech recognition apparatus includes a first storing unit configured to store a first acoustic model invariable regardless of speaker and environment, a second storing unit configured to store a classification model that has shared parameters and non-shared parameters with the first acoustic model to classify second acoustic models, a recognizing unit configured to calculate a first likelihood with regard to the input speech by applying the first acoustic model to the input speech and obtain calculation result on the shared parameter and a plurality of candidate words that have relatively large values as the first likelihood, and a calculating unit configured to calculate a second likelihood for each of the groups with regard to the input speech by use of the calculation result on the shared parameters and the non-shared parameters of the classification model.

8 Claims, 6 Drawing Sheets

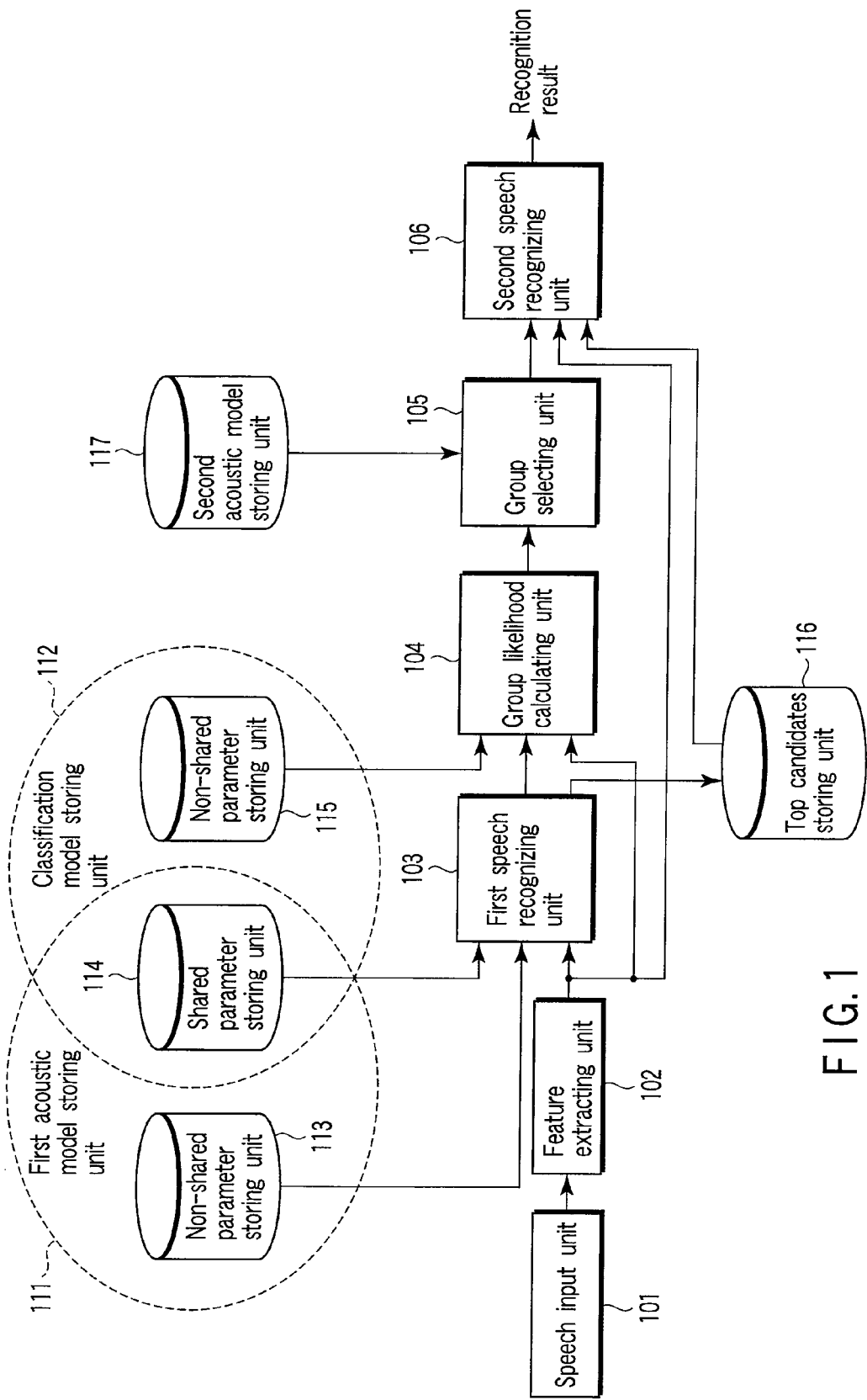
F I G. 1

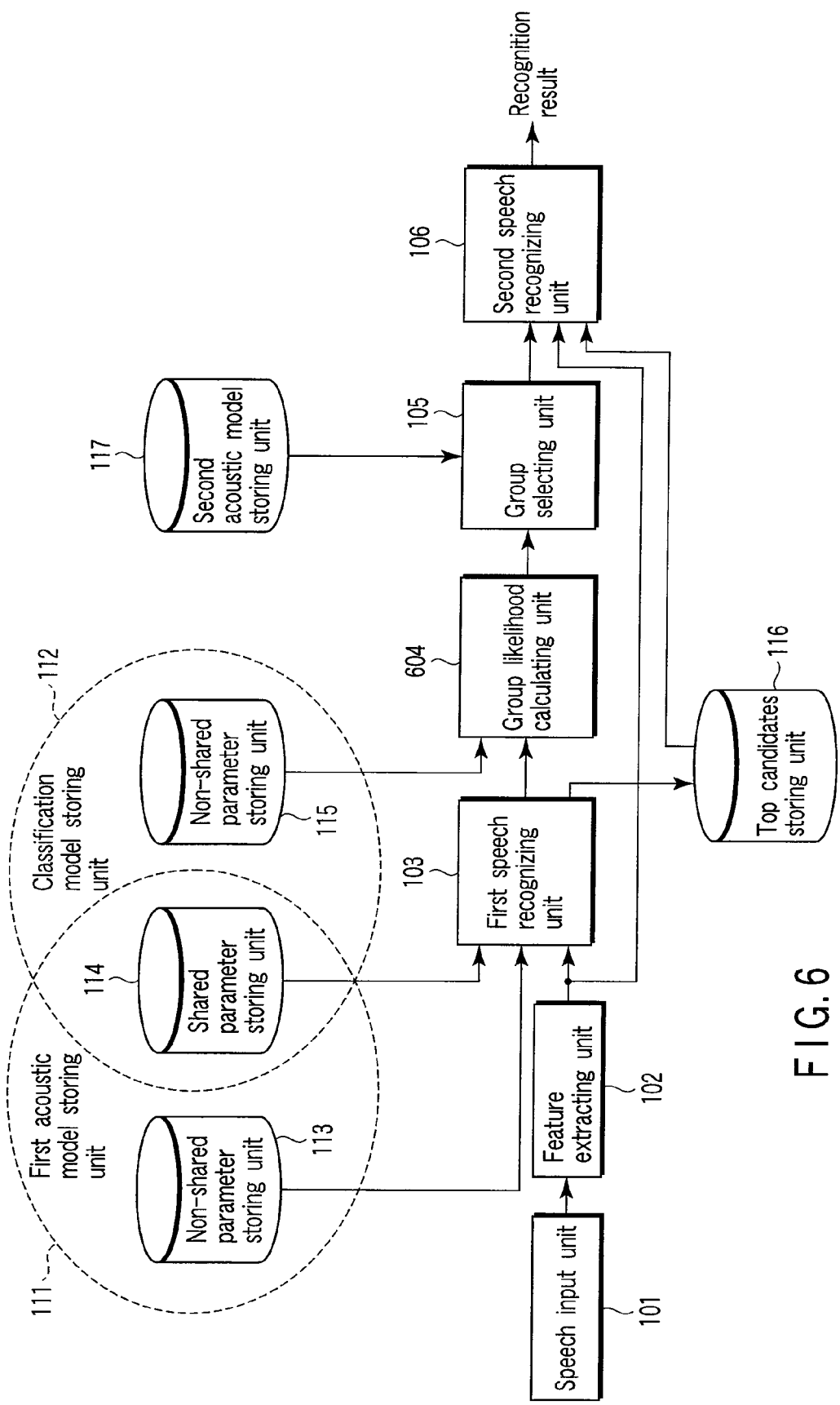
F I G. 6

APPARATUS AND METHOD FOR SPEECH RECOGNITION USING PROBABILITY AND MIXED DISTRIBUTIONS

CROSS-REFERENCE TO RELATED APPLICATIONS

This application is based upon and claims the benefit of priority from prior Japanese Patent Application No. 2007-038657, filed Feb. 19, 2007, the entire contents of which are incorporated herein by reference.

BACKGROUND OF THE INVENTION

1. Field of the Invention

The present invention relates to a speech recognition apparatus and method for performing a speech recognition process by two-pass method.

2. Description of the Related Art

In a common speech recognition process, speech input into an apparatus is recognized by use of an acoustic model. JP-A 2004-117624 (KOKAI) discloses a method of recognizing speech by selecting an acoustic model that is suitable for the input speech from among different acoustic models. Examples of conventional speech recognition processes include a two-pass method, where recognition is carried out by use of an acoustic model that is independent of any speaker and environment in the first pass, and then by use of a specific acoustic model that is dependent on the speaker or the environment of the speech in the second pass, thereby obtaining a recognition result.

Moreover, JP 3176210 suggests a technique of applying the method described in JP-A 2004-117624 (KOKAI) to the aforementioned two-pass method. In other words, an acoustic model suitable for the input speech is selected from among multiple models while the recognition is being carried out in the first pass, and then the second-pass recognition is carried out by use of the selected model so as to attain the recognition result. This method, however, has a problem of requiring a large amount of memory resources and increasing the calculation when selecting an acoustic model for the use of the second pass.

BRIEF SUMMARY OF THE INVENTION

According to an aspect of the invention, there is provided a speech recognition apparatus comprising: a first storing unit configured to store a first acoustic model invariable regardless of speaker and environment; a second storing unit configured to store second acoustic models that vary in accordance with at least either one of a specific speaker and a specific environment; a third storing unit configured to store a classification model that has shared parameters with the first acoustic model and non-shared parameters with the first acoustic model to classify the second acoustic models into different groups; a first recognizing unit configured to calculate a first likelihood with regard to the input speech by applying the first acoustic model to the input speech and obtain calculation result on the shared parameter and a plurality of candidate words that have relatively large values as the first likelihood; a calculating unit configured to calculate a second likelihood for each of the groups with regard to the input speech by use of the calculation result on the shared parameters and the non-shared parameters of the classification model; a selecting unit configured to select a group that has a largest value for the second likelihood from among the groups; and a second recognizing unit configured to recognize the input speech by applying a second acoustic model that belongs to the selected group onto the input speech to calculate a third likelihood for each of the candidate words and obtain as the recognition result a candidate word that has a largest value as the third likelihood.

According to other aspect of the invention, there is provided a speech recognition apparatus comprising: a first storing unit configured to store a first acoustic model invariable regardless of speaker and environment; a second storing unit configured to store second acoustic models that vary in accordance with at least either one of a specific speaker and a specific environment; a third storing unit configured to store a classification model to classify the second acoustic models into different groups, the classification model being a hidden Markov model that has, as an output probability distribution, a mixed normal distribution in which a plurality of normal distributions are weighted in accordance with weighting factors and combined together, having a structure, a state transition probability, and a mean vector and variance-covariance vector of all output probability distributions as shared parameters with the first acoustic model, and weighting factors of distributions as non-shared parameters with the first acoustic model; a first recognizing unit configured to recognize input speech by applying the first acoustic model and the non-shared parameters of the classification model to the input speech to obtain a plurality of candidate words having relatively high first likelihoods with respect to the input speech and second likelihood for the groups of the input speech; a selecting unit configured to select a group that has a largest value for the second likelihood from among the groups; and a second recognizing unit configured to recognize the input speech by applying a second acoustic model that belongs to the selected group onto the input speech to calculate a third likelihood for each of the candidate words and obtain as the recognition result a candidate word that has a largest value for the third likelihood.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

FIG. 1 is a block diagram illustrating a speech recognition apparatus according to the first embodiment.

FIG. 6 is a block diagram illustrating a speech recognition apparatus according to the second embodiment.

DETAILED DESCRIPTION OF THE INVENTION

Figure 2:
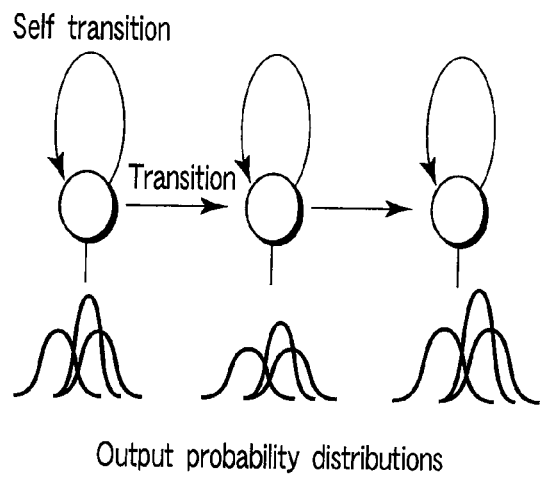
FIG. 2 is a diagram showing an example of an HMM that has, as output probability distributions, mixed distributions which corresponds to the sum of weights of probability distributions.

The embodiments of the present invention will be explained below with reference to the drawings.

First Embodiment

As illustrated in FIG. 1, a speech recognition apparatus according to the first embodiment comprises a speech input unit 101, a feature extracting unit 102, a first speech recognizing unit 103, a group likelihood calculating unit 104, a group selecting unit 105, a second speech recognizing unit 106, a first acoustic model storing unit 111, a classification model storing unit 112, a top candidates storing unit 116, and a second acoustic model storing unit 117. The first acoustic model storing unit 111 includes a non-shared parameter storing unit 113 and a shared parameter storing unit 114 for a first acoustic model. The classification model storing unit 112 includes the shared parameter storing unit 114 and a non-shared parameter storing unit 115 for a classification model.

The speech input unit 101 includes a microphone for picking up speech as an electrical signal (speech signal) and an analog-digital converter (ADC) for digitizing the speech signal to produce speech data. The speech input unit 101 sends this speech data to the feature extracting unit 102.

The feature extracting unit 102 extracts a feature from the speech data, converts the feature to a feature parameter suitable for speech recognition such as a Mel-frequency cepstrum coefficient (MFCC) and a linear predictive coding (LPC) coefficient, and outputs the feature parameter to the first speech recognizing unit 103.

The first acoustic model storing unit 111 stores a first acoustic model invariable for all speakers and environments. As the first acoustic model, a hidden Markov model (HMM) may be used which has, as its output probability distributions, mixed distributions as indicated in FIG. 2 that is obtained by multiple assigning weights to probability distributions and mixing the distributions. Details of the HMM-based speech recognition are presented, for example, in Document 1 (Seiichi Nakagawa, "Voice Recognition Using Probability Model", published by the Institute of Electronics, Information and Communication Engineers).

When adopting the HMM as the first acoustic model, examples of parameters for the first acoustic model include a model structure, state transition probabilities, probability distributions, and weighting factors assigned to the probability distributions. The HMM-based speech recognition attains the final likelihood by multiplying state transition probabilities and output probabilities. An output probability distribution may be a mixed distribution model such as a Gaussian mixture model (GMM) f(O), but should not be limited thereto.

$$f(O) = \sum_{w=1}^{W} \lambda_w N\left(O; U_W, \sum\nolimits_W\right) \quad (1)$$

$$\sum_{w=1}^{W} \lambda_w = 1, \lambda_w \geq 0$$

$$N(O) = \frac{1}{(2\pi)^{\frac{D}{2}} |\Sigma|^{\frac{1}{2}}} \exp\left(-\frac{1}{2}(O - U)' \sum\nolimits^{-1} (O - U)\right)$$

-continued $$O = \begin{bmatrix} o_1 \\ o_2 \\ \vdots \\ o_D \end{bmatrix}, U = \begin{bmatrix} u_1 \\ u_2 \\ \vdots \\ u_D \end{bmatrix}, \sum = \begin{bmatrix} \sigma_{11} & \sigma_{12} & \cdots & \sigma_{1D} \\ \sigma_{21} & \sigma_{22} & & \vdots \\ \vdots & & \ddots & \vdots \\ \sigma_{D1} & \cdots & \cdots & \sigma_{DD} \end{bmatrix}$$

In this expression, W is the number of mixed distributions, λ is a weighting factor, N(O) is a normal distribution, O is an observed vector, U is a mean vector, Σ is a variance-covariance matrix, and D is the number of dimensions.

Figure 3:
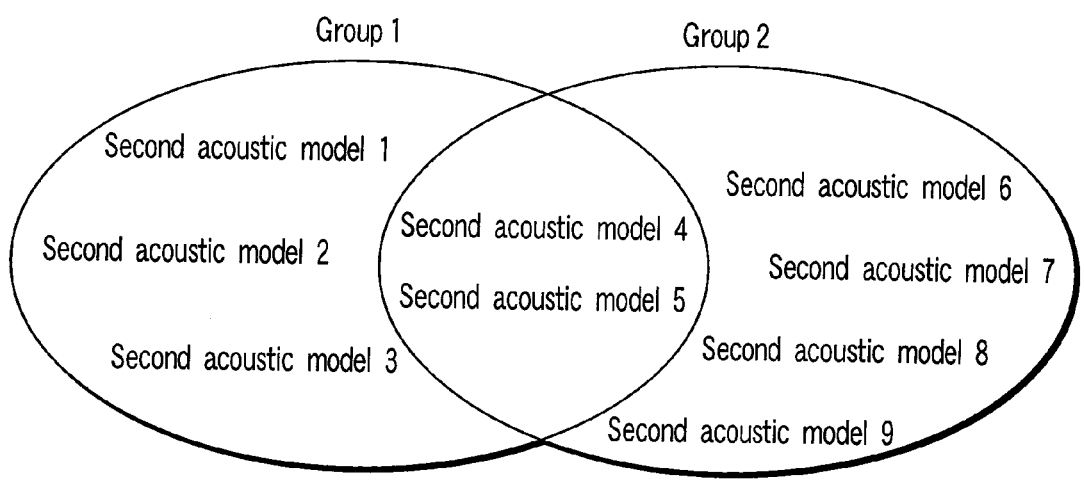
FIG. 3 is a diagram showing an example of classification of second acoustic model groups stored in the second acoustic model storing unit illustrated in FIG. 1.

The non-shared parameter storing unit 115 of the classification model storing unit 112 stores parameters of the classification model that are not shared with the first acoustic model. The classification model is employed to classify the second acoustic models, which will be described later, into different groups (for instance, Groups 1 and 2) as illustrated in FIG. 3, in accordance with predetermined classification criteria. Some of the parameters of the classification model are shared with the first acoustic model. In other words, the shared parameter storing unit 114 of the classification model storing unit 112 store parameters shared by the first acoustic model and the classification model, while the non-shared parameter storing unit 115 stores the parameters of the classification model that are not shared with the first acoustic model.

As shown in FIG. 3, the classification may be designed in such a manner that a second acoustic model that belongs to one group may belong to another group. For instance, if the second acoustic model is a speaker dependent model, the classification criteria may be gender and age.

If the first acoustic model is an HMM that has, as its output probability distribution, a mixed distribution obtained by assigning weights to probability distributions in accordance with weighting factors and mixing the distributions, the classification model is constituted by a similar HMM or output probability distribution only. If the first acoustic model and classification model are both HMMs, the two models share any parameters other than the weighting factors λ of the output probability distributions. At this point, if their output probability distributions are mixed normal distributions, the first acoustic model and the classification model share a mean vector U and a variance-covariance matrix Σ, which are parameters other than the weighting factors λ.

The parameters for the first acoustic model and the classification model may be obtained by use of an EM algorithm indicated, for example, in Document 2 (Kiyohiro Shikano, Katsunobu Itou, Tatsuya Kawahara, Kazuya Takeda, and Mikio Yamamoto, "Speech Recognition System" published by Ohmsha). More specifically, at first, parameters for the first acoustic model are obtained on the basis of the learning data of the first acoustic model, and then non-shared parameters for the classification model are obtained on the basis of the learning data of the classification model while the shared parameters are fixed. When the first acoustic model and the classification model are both HMMs which have mixed normal distributions as their output probability distributions and share any parameters other than weighting factors λ, parameters for the first acoustic model are first obtained. Then, learning of the weighting factors λ is conducted while shared parameters are fixed. Classification models corresponding to individual groups can be thereby created, which have the same model structure, the same state transition probability, the same mean vector U, and the same variance-covariance matrix Σ, but different weighting factors λ.

Figure 4:
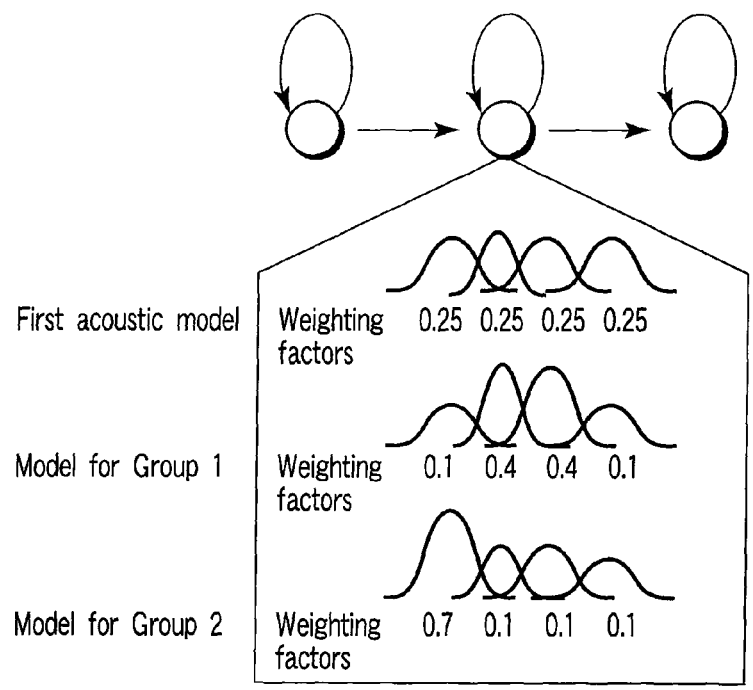
FIG. 4 is a diagram showing an example of a process of obtaining a classification model when output probability distributions of an HMM is represented by four weighed normal distributions.

In the following explanation, the production of classification models when the output probability distribution of the HMM includes four normal distributions that are mixed will be dealt with, with reference to FIG. 4. It is assumed that the four weighting factors $\lambda_w$ of the first acoustic model are 0.25, 0.25, 0.25, and 0.25 from the left with respect to the probability distributions in FIG. 4. When these weighting factors $\lambda_w$ of the first acoustic model are updated by use of the speech that belongs to Group 1, the weighting factors of Group 1 are determined as 0.1, 0.4, 0.4, and 0.1. Then, when the weighting factors $\lambda_w$ are updated again by use of the speech that belongs to Group 2, the weighting factors of Group 2 are determined as 0.7, 0.1, 0.1, and 0.1. The classification model which shares parameters other than weighting factors $\lambda_w$ with the first acoustic model is thereby produced. The parameters may be obtained in any method other than the above. For instance, all the parameters may be obtained at the same time. Alternatively, in the reverse manner of the aforementioned method, learning of the parameters of the classification model may be first conducted, and then non-shared parameters of the first acoustic model may be obtained while the shared parameters are fixed.

The first speech recognizing unit 103 performs the first speech recognition process on the feature of the speech extracted by the feature extracting unit 102 by use of the first acoustic model. In the first speech recognition process, the first acoustic model is applied to the speech feature of the input speech so that the likelihood for each of the candidate words for the input speech is calculated. The first speech recognizing unit 103 outputs candidate words that have relatively high likelihoods as top candidates. The top candidates storing unit 116 stores these candidates.

In addition, the first speech recognizing unit 103 calculates output probabilities at the time of obtaining the likelihoods. Among these distributions, the calculation results of the output probabilities of distributions that share parameters with the classification models (shared output probability distributions) are sent to the group likelihood calculating unit 104. For instance, some of the output probability distributions of the classification models are the shared parameters of output probability distributions, sharing the mean vector $U_w$ and the variance-covariance matrix $\Sigma_w$ with the first acoustic model but having weighting factors $\lambda_w$ different from those of the first acoustic model. If this is the case, the calculation result N $(O; U_w, \Sigma_w)$ of the shared output probabilities obtained by use of the first acoustic model is sent to the group likelihood calculating unit 104. When the group likelihood calculating unit 104 calculates the group likelihood, which will be discussed later, the calculation result N $(O; U_w, \Sigma_w)$ of the shared output probabilities is utilized so that the shared output probabilities do not have to be re-calculated.

The group likelihood calculating unit 104 calculates the likelihood for each group corresponding to the input speech. In this calculation, the classification model is applied onto the speech feature of the input speech. At this point, because the calculation result of the aforementioned shared output probabilities has been received, the group likelihood calculating unit 104 uses this result. For instance, in the calculation of the group likelihood, if the classification model is a mixed normal distribution, the normal distributions N $(O; U_w, \Sigma_w)$ are multiplied by the weighting factors $\lambda_w$ and combined together to obtain the output probability f(O). Here, calculation can be omitted with regard to output probabilities of the shared distributions N $(O; U_w, \Sigma_w)$ because the calculation result obtained at the first speech recognition can be used. Hence, the group likelihood calculating unit 104 performs calculation only on the output probability distributions N $(O; U_w, \Sigma_w)$ that do not share parameters with the first acoustic model (non-shared probability distributions), by use of the speech features. The group likelihood calculating unit 104 may be configured in such a manner that the unit 104 performs likelihood calculation on a frame of the HMM in relation to a certain state and omits calculation on other frames.

The second acoustic model storing unit 117 stores a second acoustic model that varies in accordance with at least either one of speaker and environment. The second acoustic model should be any model that can be used at the second speech recognizing unit 106, for instance, an HMM that has as its output probability distribution a mixed normal distribution obtained by learning from the speech. The second acoustic model therefore does not always need to have parameters shared with the first acoustic model.

The group selecting unit 105 selects a group having the highest likelihood based on the group likelihoods calculated by the group likelihood calculating unit 104, and sends any second acoustic model that belongs to the selected group to the second speech recognizing unit 106.

The second speech recognizing unit 106 conducts a speech recognition process on the speech feature extracted by the features extracting unit 102 by use of the second acoustic models of the group selected by the group selecting unit 105. In the speech recognition process at the second speech recognizing unit 106, the second acoustic models are applied onto the speech feature of the input speech, and thereby the likelihood for each of the top candidates of the input speech stored in the top candidates storing unit 116 is calculated. Then, the second speech recognizing unit 106 selects the candidate word with the highest likelihood from among the top candidates and outputs it as the final recognition result.

Figure 5:
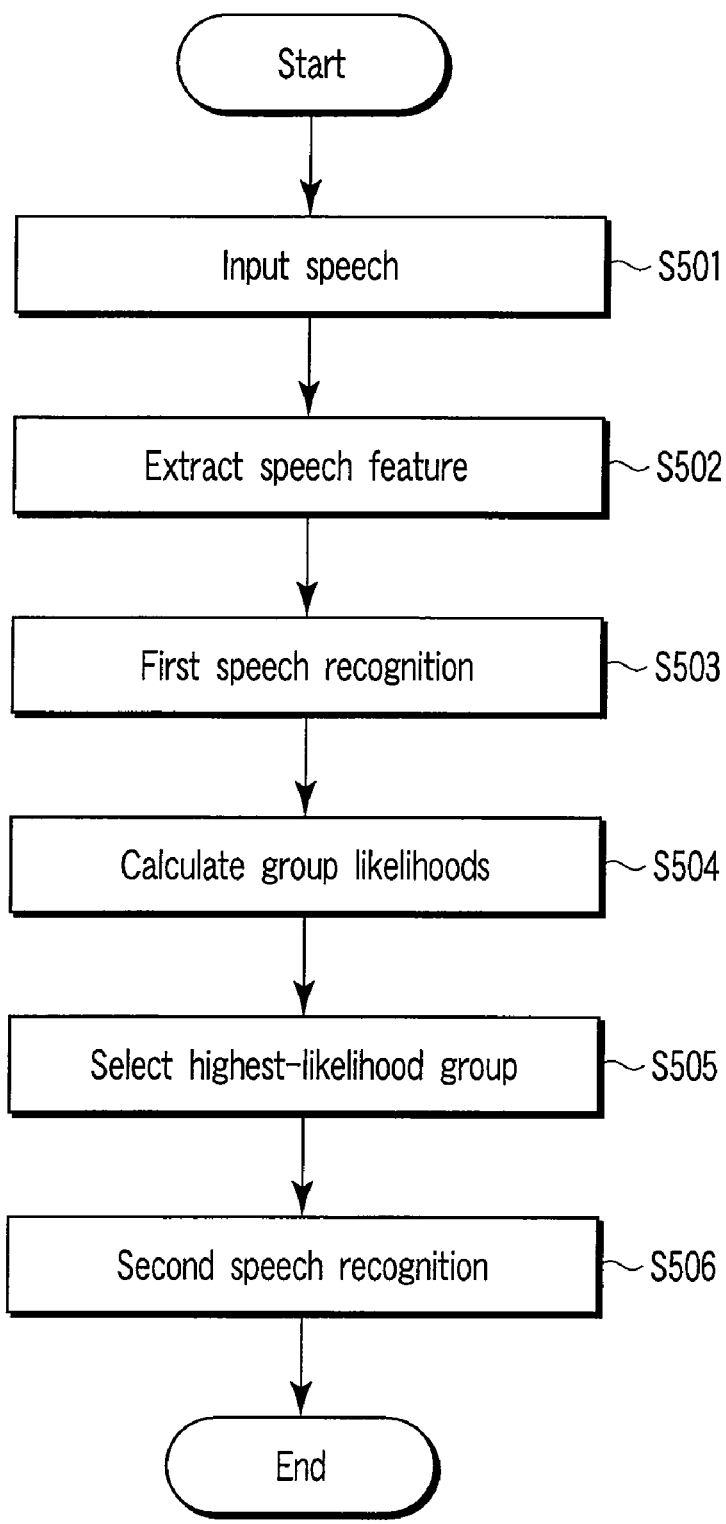
FIG. 5 is a flowchart of operations preformed by the speech recognition apparatus illustrated in FIG. 1.

The operation of the speech recognition apparatus illustrated in FIG. 1 will be explained next, with reference to FIG. 5.

First, speech is input by the speech input unit 101 (Step S501). The speech input unit 101 performs analog-digital conversion on the input speech and sends the digital data to the feature extracting unit 102.

Next, the feature extracting unit 102 extracts speech features from the speech data of the input speech (Step S502). Then, the first speech recognizing unit 103 obtains the first acoustic model from the first acoustic model storing unit 111, and uses this first acoustic model to calculate the likelihood of each of candidate words in relation to the input speech. Candidate words with higher likelihoods are stored as top candidates in the top candidates storing unit 116 (Step S503).

Thereafter, the group likelihood calculating unit 104 calculates the likelihood for each group of the input speech (Step S504). More specifically, the group likelihood calculating unit 104 obtains non-shared parameters of the classification model from the non-shared parameter storing unit 115 for the classification model, and calculates the non-shared output probability by use of the non-shared parameters and the features of the input speech. Then, based on this calculation result and also on the calculation result of the shared output probability distribution obtained from the first speech recognizing unit 103, the group likelihood calculating unit 104 calculates the likelihood for each group of the input speech.

Then, the group selecting unit 105 selects the group with the highest likelihood for the input speech based on the likelihoods for all the groups, and obtains the second acoustic models included in this group from the second acoustic model storing unit 117 (Step S505).

Finally, the second speech recognizing unit 106 calculates the likelihood for each of the top candidates of the input speech by use of the second acoustic model included in the most probable group, and outputs the candidate with the highest likelihood as the final recognition result (Step S506).

According to the present embodiment, because some parameters are shared by the first acoustic model and the classification model, the memory usage can be reduced in comparison with a structure that stores parameters separately for the first acoustic model and for the classification model. Furthermore, because the group likelihood calculating unit 104 uses the calculation result of the first speech recognizing unit 103 on the shared output probability distributions, the amount of likelihood calculation for each group can be reduced. The process illustrated in FIG. 5 for operating the speech recognition apparatus illustrated in FIG. 1 can be in the form of a computer readable storage medium storing instructions of a computer program which when executed by a computer results in performance of the following steps. A first acoustic model invariable regardless of speaker and environment is stored and second acoustic models that vary in accordance with at least either one of a specific speaker and a specific environment are stored. Then, a classification model that has shared parameters with the first acoustic model and non-shared parameters with the first acoustic model to classify the second acoustic models into different groups is stored. A calculation of a first likelihood with regard to the input speech by applying the first acoustic model to the input speech is obtained and a calculation result on the shared parameter and a plurality of candidate words that have relatively large values as the first likelihood is obtained. Next, a second likelihood for each of the groups with regard to the input speech by use of the calculation result on the shared parameters and the non-shared parameters of the classification model is obtained. A group that has a largest value for the second likelihood from among the groups is selected. Finally, the input speech is recognized by applying a second acoustic model that belongs to the selected group onto the input speech to calculate a third likelihood for each of the candidate words and obtain as the recognition result a candidate word that has a largest value as the third likelihood.

Second Embodiment

As shown in FIG. 6, a speech recognition apparatus according to the second embodiment comprises a group likelihood calculating unit 604, which is incorporated in place of the group likelihood calculating unit 104 of the speech recognition apparatus illustrated in FIG. 1. In FIG. 6, the same structural components as the ones of FIG. 1 are given the same reference numerals, and the explanation thereof is omitted. The following explanation therefore focuses mainly on portions of the structure that are different from FIG. 1.

In the present embodiment, the first acoustic model and the classification model are both HMMs, where their model structures and state transition probabilities are the same. In addition, all the output probability distributions share parameters. Parameters may be shared with the aforementioned method.

The group likelihood calculating unit 604 calculates the likelihood for each group of the input speech. At this point, because the group likelihood calculating unit 604 has received the calculation result of the aforementioned shared output probabilities from the first speech recognizing unit 103, the group likelihood calculating unit 604 uses this result.

In this embodiment, the classification model shares parameters for all the output probability distributions with the first acoustic model. This means that the calculation is completed for all the normal distributions $N(O; U_w, \Sigma_w)$. Thus, the group likelihood calculating unit 604, which does not have to conduct calculation on any normal distribution $N(O; U_w, \Sigma_w)$, does not require any feature for the input speech. The group likelihood calculating unit 604 therefore multiplies the output of normal distributions $N(O; U_w, \Sigma_w)$ obtained from the first speech recognizing unit 103 by the weighting factors $\lambda_w$ of each group and combines the normal distributions together to attain the output probability f(O). Thereafter, the group likelihood calculating unit 604 multiplies the output probability f(O) by the state transition probabilities to calculate likelihood for each group.

According to the present embodiment, the first acoustic model and the classification model are both HMMs that have the same state transition probabilities and the model structure, and share parameters for all the output probability distributions. Hence, the memory usage can be significantly reduced, in comparison with a structure separately storing the parameters. Furthermore, the group likelihood calculating unit 604, which uses the result of the first speech recognizing unit 103 performing calculations on the normal distributions $N(O; U, \Sigma)$, can reduce the amount of calculation on the likelihood calculation for each group.

Third Embodiment

Figure 7:
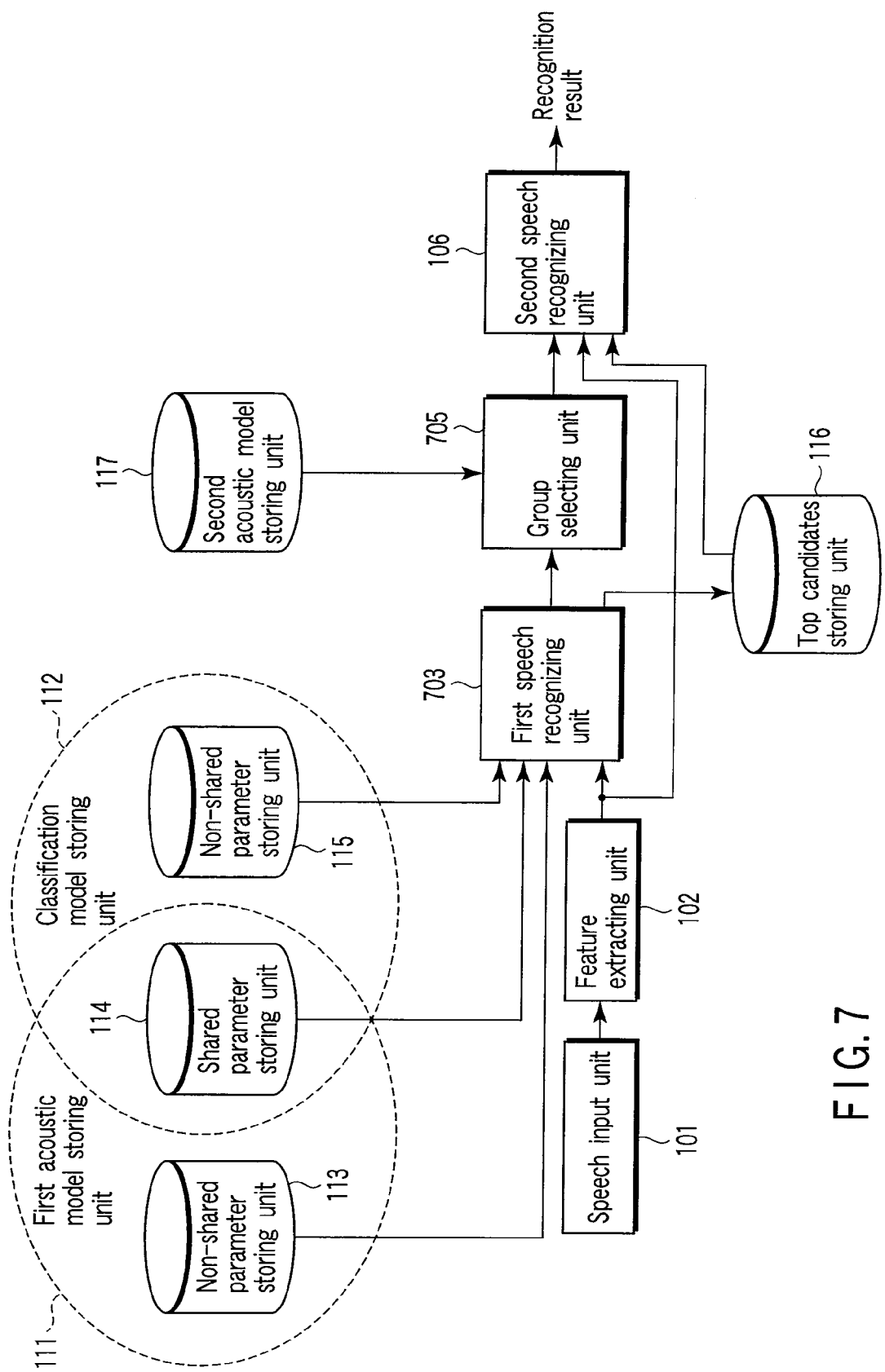
FIG. 7 is a block diagram illustrating a speech recognition apparatus according to the third embodiment.

In a speech recognition apparatus according to the third embodiment as illustrated in FIG. 7, a first speech recognizing unit 703 is provided with the function of the group likelihood calculating unit 604 of FIG. 6 according to the second embodiment, and a group selecting unit 705 is incorporated in place of the group selecting unit 105. In FIG. 7, the same structural components as the ones of FIG. 6 are given the same reference numerals, and the explanation thereof is omitted. The following explanation therefore focuses mainly on portions of the structure that are different from FIG. 6.

Figure 8:
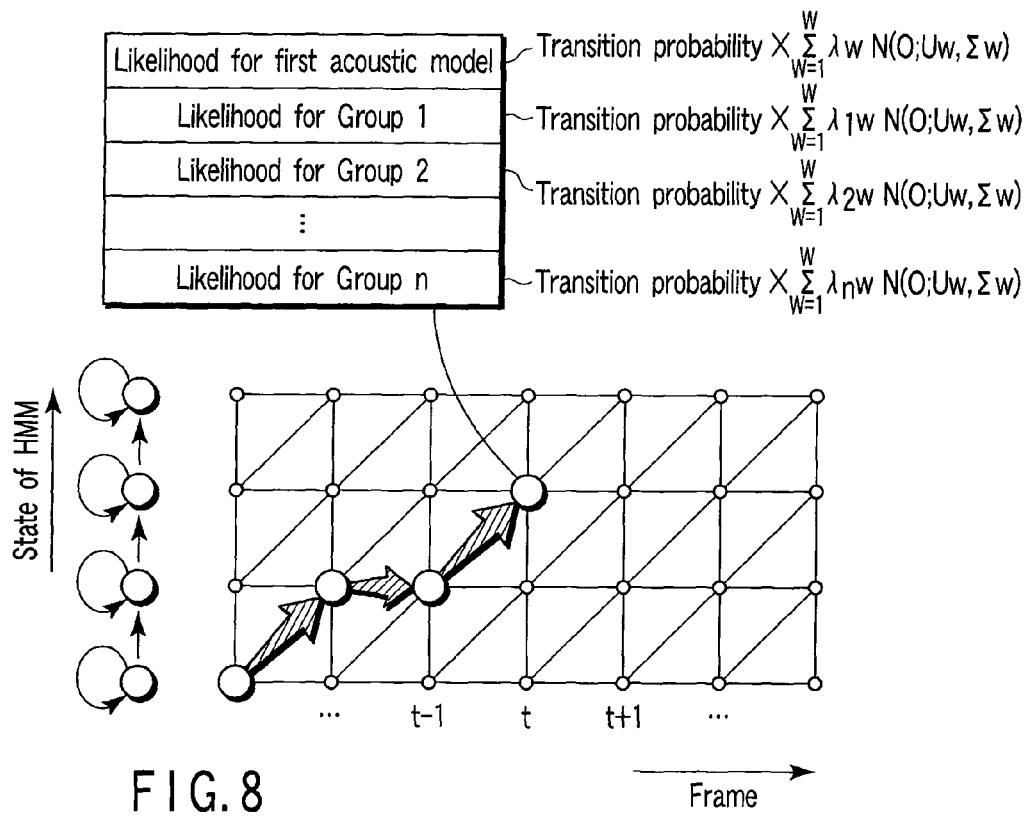
FIG. 8 is a diagram showing an example of likelihood calculation for each group performed by the first speech recognizing unit illustrated in FIG. 7.

The first speech recognizing unit 703 performs a first speech recognition process by applying the first acoustic model and the classification model onto the feature of the input speech. The first speech recognition process includes calculation of the likelihood for each group based on all the recognition result, in addition to the aforementioned output of top candidates. A specific example will be considered, where the output probability distribution of the classification model is a mixed normal distribution, and the classification model and the first acoustic model share all the parameters except for the weighting factors. When calculating the likelihood for the frame of the ordinal number t by use of the first acoustic model as shown in FIG. 8, the first speech recognizing unit 703 multiplies the output of normal distributions $N(O; U_w, \Sigma_w)$ by the weighting factor $\lambda_w$ of the first acoustic model and combines the distributions. In parallel to this multiplication, the output of normal distributions $N(O; U_w, \Sigma_w)$ are multiplied by the weighting factor $\lambda_{iw}$ of each group (where i represents the group number. When there are n groups, i is any integer from 1 to n) and combined, and the product is multiplied by the state transition probabilities. The likelihood for each group can be thereby attained.

The group selecting unit 705 selects the optimal group for the input speech based on the likelihoods of the groups calculated by the first speech recognizing unit 703 on all the recognition results, and sends the second acoustic models included in this group to the second speech recognizing unit 106. The likelihoods for the groups differ from candidate to candidate, and the optimal group may be selected by the following method. For example, the first speech recognition finds that the most likely candidate word is "aka", and the second most likely candidate word is "aki". In such a case, (a) the group with the highest group likelihood for the most likely candidate word of the input speech, i.e., the group with the highest group likelihood for the word "aka", or (b) the group with the highest group likelihood independently of the likelihoods of candidate words, i.e., the group with the highest group likelihood for either "aka" or "aki" is selected as the optimal group.

According to the present embodiment, the process performed by the group likelihood calculating unit 604 of the second embodiment is incorporated into the first speech recognizing unit 703. Thus, the calculation of group likelihoods and the detection of top candidates can be performed in parallel.

Fourth Embodiment

Next, the fourth embodiment will be explained. The classification model according to this embodiment is a mixed normal distribution model and shares some parameters of all distributions with the output probability distributions of the first acoustic model. The structure of the speech recognition apparatus according to the second embodiment illustrated in FIG. 6 and the structure of the speech recognition apparatus according to the third embodiment illustrated in FIG. 7 are both applicable to the present embodiment.

In the operation of the speech recognition apparatus according to the present invention, the group likelihood calculation according to the second and third embodiments is modified in the following fashion. In the first speech recognition process of the present embodiment, the group likelihoods are added in relation to all the possible HMM paths that the first acoustic model can take. The output probability for each group can be calculated with the aforementioned method. In this manner, the calculation is carried out only on the likelihood for the input speech of each group.

It should be noted that the present invention is not limited to the above embodiments and can be embodied by incorporating modifications to the structural elements without departing from the gist of the invention. Furthermore, the structural elements in any embodiment of the above may be suitably combined to achieve various inventions. Some of the structural elements may be removed from the structures of the above embodiments to achieve a different structure. Moreover, structural elements of different embodiments may be suitably combined.

What is claimed is:

1. A speech recognition apparatus comprising:
a first storing unit configured to store a first acoustic model invariable regardless of speaker and environment;
a second storing unit configured to store second acoustic models that vary in accordance with at least either one of a specific speaker and a specific environment;
a third storing unit configured to store a classification model that has shared parameters with the first acoustic model and non-shared parameters with the first acoustic model to classify the second acoustic models into different groups;
a first recognizing unit configured to calculate a first likelihood with regard to the input speech by applying the first acoustic model to the input speech and obtain calculation result on the shared parameter and a plurality of candidate words that have relatively large values as the first likelihood;
a calculating unit configured to calculate a second likelihood for each of the groups with regard to the input speech by use of the calculation result on the shared parameters and the non-shared parameters of the classification model;
a selecting unit configured to select a group that has a largest value for the second likelihood from among the groups; and
a second recognizing unit configured to recognize the input speech by applying a second acoustic model that belongs to the selected group onto the input speech to calculate a third likelihood for each of the candidate words and obtain as the recognition result a candidate word that has a largest value as the third likelihood, wherein:
the first acoustic model and the classification model are hidden Markov models that have, as output probability distributions, mixed normal distributions in which a plurality of normal distributions are weighted in accordance with weighting factors and combined together,
the shared parameters include a shared mean vector and a shared variance-covariance matrix to calculate a shared output probability distribution which is one of the output probability distributions of the classification model,
the calculating unit obtains a first normal distribution as the calculation result from the first speech recognizing unit, multiplies the first normal distribution by a weighting factor to calculate the shared output probability distribution, calculates a second normal distribution by use of a non-shared mean vector and a non-shared variance-covariance matrix contained in the non-shared parameters and a feature of the input speech, multiplies the second normal distribution by a weighting factor to calculate a non-shared output probability distribution, and multiplies the shared output probability distribution and the non-shared output distribution by state transition probabilities to obtain the second likelihood, and
the first normal distribution is calculated by use of the feature of the input speech, the shared mean vector and the shared variance-covariance matrix.

2. The apparatus according to claim 1, wherein the classification model is a hidden Markov model that has, as an output probability distribution, a mixed normal distribution in which a plurality of normal distributions are weighted in accordance with weighting factors and combined together, has a structure and a state transition probability the same as a structure and a state transition probability of the first acoustic model, and has a mean vector and a variance-covariance matrix as the shared parameters in all output probability distributions.

3. The apparatus according to claim 1, wherein the classification model is a mixed normal distribution model and has the output probability distribution of the first acoustic model and all the distributions as the shared parameters.

4. A speech recognition apparatus comprising:
a first storing unit configured to store a first acoustic model invariable regardless of speaker and environment;
a second storing unit configured to store second acoustic models that vary in accordance with at least either one of a specific speaker and a specific environment;
a third storing unit configured to store a classification model to classify the second acoustic models into different groups, the classification model being a hidden Markov model that has, as an output probability distribution, a mixed normal distribution in which a plurality of normal distributions are weighted in accordance with weighting factors and combined together, having a structure, a state transition probability, and a mean vector and variance-covariance matrix of all output probability distributions as shared parameters with the first acoustic model, and weighting factors of distributions as non-shared parameters with the first acoustic model;

a first recognizing unit configured to recognize input speech by applying the first acoustic model and the non-shared parameters of the classification model to the input speech to obtain a plurality of candidate words having relatively high first likelihoods with respect to the input speech and second likelihood for the groups of the input speech;

a selecting unit configured to select a group that has a largest value for the second likelihood from among the groups; and a second recognizing unit configured to recognize the input speech by applying a second acoustic model that belongs to the selected group onto the input speech to calculate a third likelihood for each of the candidate words and obtain as the recognition result a candidate word that has a largest value for the third likelihood.

5. The apparatus according to claim 4, wherein the first speech recognizing unit calculates the output of normal distributions by use of features of the input speech and the shared parameters, multiplies the output of normal distributions by the weighting factors of the first acoustic model to combine, and then multiplies products by state transition probabilities to obtain the first likelihoods, and in parallel, the first speech recognizing unit multiplies weighting factors corresponding to the groups by the normal distributions to combine and then multiplies products by the state transition probabilities to obtain the second likelihood.

6. A speech recognition method comprising:
storing a first acoustic model invariable regardless of speaker and environment;
storing second acoustic models that vary in accordance with at least either one of a specific speaker and a specific environment;
storing a classification model that has shared parameters with the first acoustic model and non-shared parameters with the first acoustic model to classify the second acoustic models into different groups;
calculating a first likelihood with regard to the input speech by applying the first acoustic model to the input speech and obtaining calculation result on the shared parameter and a plurality of candidate words that have relatively large values as the first likelihood;
calculating a second likelihood for each of the groups with regard to the input speech by use of the calculation result on the shared parameters and the non-shared parameters of the classification model;
selecting a group that has a largest value for the second likelihood from among the groups; and
recognizing the input speech by applying a second acoustic model that belongs to the selected group onto the input speech to calculate a third likelihood for each of the candidate words and obtain as the recognition result a candidate word that has a largest value as the third likelihood, wherein:
the first acoustic model and the classification model are hidden Markov models that have, as output probability distributions, mixed normal distributions in which a plurality of normal distributions are weighted in accordance with weighting factors and combined together,
the shared parameters include a shared mean vector and a shared variance-covariance matrix to calculate a shared output probability distribution which is one of the output probability distributions of the classification model,
obtaining a first normal distribution, multiplying the first normal distribution by a weighting factor to calculate the shared output probability distribution, calculating a second normal distribution by use of a non-shared mean vector and a non-shared variance-covariance matrix contained in the non-shared parameters and a feature of the input speech, multiplying the second normal distribution by a weighting factor to calculate a non-shared output probability distribution, and multiplying the shared output probability distribution and the non-shared output distribution by state transition probabilities to obtain the second likelihood, and calculating the first normal distribution by use of the feature of the input speech, the shared mean vector and the shared variance-covariance matrix.

7. The method according to claim 6, wherein the classification model is the hidden Markov model that has a structure and a state transition probability the same as a structure and a state transition probability of the first acoustic model, and has a mean vector and a variance-covariance matrix as the shared parameters in all output probability distributions.

8. A non-transitory computer readable storage medium storing instructions of a computer program which when executed by a computer results in performance of steps comprising:
storing a first acoustic model invariable regardless of speaker and environment;
storing second acoustic models that vary in accordance with at least either one of a specific speaker and a specific environment;
storing a classification model that has shared parameters with the first acoustic model and non-shared parameters with the first acoustic model to classify the second acoustic models into different groups;
calculating a first likelihood with regard to the input speech by applying the first acoustic model to the input speech and obtaining calculation result on the shared parameter and a plurality of candidate words that have relatively large values as the first likelihood;
calculating a second likelihood for each of the groups with regard to the input speech by use of the calculation result on the shared parameters and the non-shared parameters of the classification model;
selecting a group that has a largest value for the second likelihood from among the groups; and
recognizing the input speech by applying a second acoustic model that belongs to the selected group onto the input speech to calculate a third likelihood for each of the candidate words and obtain as the recognition result a candidate word that has a largest value as the third likelihood, wherein:
the first acoustic model and the classification model are hidden Markov models that have, as output probability distributions, mixed normal distributions in which a plurality of normal distributions are weighted in accordance with weighting factors and combined together,
the shared parameters include a shared mean vector and a shared variance-covariance matrix to calculate a shared output probability distribution which is one of the output probability distributions of the classification model,
obtaining a first normal distribution, multiplying the first normal distribution by a weighting factor to calculate the shared output probability distribution, calculating a second normal distribution by use of a non-shared mean vector and a non-shared variance-covariance matrix contained in the non-shared parameters and a feature of the input speech, multiplying the second normal distribution by a weighting factor to calculate a non-shared output probability distribution, and multiplying the shared output probability distribution and the non-shared output distribution by state transition probabilities to obtain the second likelihood, and
calculating the first normal distribution by use of the feature of the input speech, the shared mean vector and the shared variance-covariance matrix.

* * * * *